United States Patent Office 3,032,397
Patented May 1, 1962

3,032,397
PREPARATION OF METAL NITRIDE PIGMENT FLAKES
Donald O. Niederhauser, Wilmington, Del., assignor to E. I. du Pont de Nemours and Company, Wilmington, Del., a corporation of Delaware
No Drawing. Filed Jan. 25, 1957, Ser. No. 636,250
11 Claims. (Cl. 23—191)

This invention relates to an improved process for the preparation of pellicles of vanadium and group IV–B metal nitrides. More particularly this invention relates to an improved process for the preparation of coatings and flakes of vanadium and group IV–B metal nitrides.

The nitrides of metals of group IV–B, e.g., titanium, and vanadium in group V–B are relatively stable compounds. They are similar to metals in many properties, e.g., they have high electrical conductivity and have metallic luster. Coatings of such nitrides generally have a pleasing metallic appearance, e.g., titanium nitride exhibits a bronze yellow color. Coatings of such nature would provide hard and decorative films on various objects if a method were available for their uniform and reproducible preparation. Furthermore, flakes of such nitrides would have considerable utility as pigments or inert fillers in paints for attractive and durable coatings if they could be made available.

Nitride coatings have heretofore been obtained by reduction (with hydrogen) of volatile metal halides in the presence of nitrogen (Van Arkel, Z. anorg. allg. Chem. 148, 345 (1925)). However, such process has not been found to give uniform coatings on objects, particularly on irregularly shaped objects. Preparation of coatings of nitrides have required very high temperatures, e.g., of the order of 1200° C. or higher. The use of reduced pressure was not found to aid in the preparation of nitride coatings by such process.

It is an object of this invention to provide an improved process for the preparation of pellicles of vanadium and group IV–B metal nitrides. Another object is to provide an improved process for the preparation of uniform coatings of vanadium and group IV–B metal nitrides on solid surfaces. Still another object is to provide novel flakes of vanadium and group IV–B metal nitrides which are useful as pigments and methods for their preparation. Other objects will appear hereinafter.

These and other objects of this invention are accomplished by the following process for the preparation of vanadium and group IV–B metal nitride pellicles (coatings, flakes and the like) which comprises heating and vaporizing an adduct of a tetrahalide of vanadium or of a metal of group IV–B and ammonia or an ammonium halide, at a temperature within the range of 175 to 400° C. under a pressure of less than 100 mm., preferably of not more than 5 mm., and immediately contacting said vaporized adduct under the aforesaid pressure with the surface of a solid substrate which is heated to a temperature of 550 to 950° C., thereby forming on said surface a nitride coating of vanadium or a metal of group IV–B. The metal nitride, e.g., titanium nitride coated object is then removed from the furnace.

Metal nitride flakes of vanadium or group IV–B metals are obtained, after the coated substrate is removed from the evacuated container, by removing, i.e., peeling off, the metal nitride coating, e.g., by scraping off the metal nitride coating or by contacting the metal nitride coating on a ceramic or other solid substrate with reagents which attack the substrate, e.g., hydrofluoric acid for coatings on siliceous substrates. The flakes can be subjected to mechanical shearing to provide uniform small sizes or flakes for use as pigments. The adhesion of the coating depends on the nature of the substrate being coated and the amount of contamination present.

The process of this invention provides an improved method of obtaining an attractive metal nitride coating that is uniform in thickness and that is hard and abrasion resistant. The process also provides an improved method for obtaining metal nitride flakes useful as pigments which flakes have a thickness of 0.1 to 3 microns and the other dimensions are within the range of 20 to 100 microns. This invention also includes these novel flakes of vanadium and group IV–B metal nitrides which are useful as pigments.

The examples which follow further illustrate the preparation of the metal nitride coatings and flakes of this invention.

Example I

Vanadium tetrachloride (0.3 ml.) was placed in a "Vycor" high temperature resistant glass tube and frozen with liquid nitrogen. Liquid ammonia was added to the tube and reacted with the $VCl_4$ to give a pinkish gray adduct. The excess ammonia was pumped out, and the tube was attached to the vacuum train and placed in the furnace.

The main horizontal tube furnace was heated at 770° C. A small horizontal tube furnace was used to heat the end of the tube containing the $VCl_4/NH_3$ adduct to 330° C. The pressure during the run was about 330 microns. A "Vycor" high temperature resistant glass plate placed in the 770° furnace was coated with an adherent silvery gray coating of vanadium nitride. Electron diffraction of this coating showed a pattern characteristic of VN.

Example II

An adduct of $TiCl_4$ and ammonium chloride was prepared by the sublimation of ammonium chloride in an evacuated tube in the presence of $TiCl_4$ vapors. $TiCl_4$ (20 ml.) was placed in a closed L-shaped region at the end of a "Vycor" high temperature resistant glass tube. The center of the tube was packed with 10 g. of ammonium chloride between plugs of glass wool. The $TiCl_4$ was degassed by repeated freezing and pumping and was then allowed to distill slowly from the L-tube across the ammonium chloride into a liquid nitrogen trap on the other side of the furnace region. The ammonium chloride was heated in the furnace to 300° C., causing the ammonium chloride to sublime slowly. The stream of $TiCl_4$ swept all of the ammonium chloride vapor towards the trap. The vapors condensed along the cold region of the tube before the trap as a yellow crystalline solid. The rate of sublimation was such that about two hours was required to volatilize all of the ammonium chloride. A yellow crystalline deposit (25 g.) was scraped from the walls of the tube. It contained 15.3% titanium and the X-ray diffraction pattern of the sample exhibited lines corresponding to the pattern for ammonium chloride and additional unidentified lines.

A portion of the adduct (1 g.) prepared as above was placed in the closed end of a 24 mm. "Vycor" high temperature resistant glass tube. A plug of glass wool was inserted at the end to prevent particles from blowing through the tube, and a ½ inch by 4 inch "Vycor" high temperature resistant glass plate was placed in the center of the tube. The tube was evacuated and heated along its central portion in the main horizontal tube furnace to 900° C. The end containing the adduct was slowly warmed in a second furnace with continuous pumping. The second furnace on the end of the tube was heated to 325° and held there for 45 minutes with a pressure in the tube of up to about 2 mm. and a manifold pressure of .01 mm. After opening the tube, the "Vycor" high temperature resistant glass plate was removed. It was uniformly covered with a metallic gold coating of titanium nitride that was very adherent.

Sheets of mica as well as "Pyrex" high temperature resistant glass flakes were coated with titanium nitride by the above procedure to give bright golden and reflective coatings.

Example III

A titanium tetrachloride/ammonium chloride adduct (1 g.) prepared as in Example II was heated in a furnace to 400° C. in 15 minutes under a pressure of less than 2 mm., and the vapors were passed over a sample of autobody steel placed in a furnace heated at 800° C. An adherent, yellow golden coating of titanium nitride was obtained which resisted rubbing with scouring powder and was only slightly corroded by 48 hours immersion in tap water.

Example IV

Coatings of titanium nitride were applied in the same way as in Example III to nickel and to nickel-plated autobody steel. The nickel-plated autobody steel sample was a polished ½" by 12" strip, lightly plated for ½ its length with nickel and then repolished on a buffing wheel. Abrasion tests on the titanium nitride coating on nickel-plated autobody steel showed a high resistance to abrasion by silicon carbide powder.

Example V

A copper roll was nickel-plated and then coated at 800° C. with titanium nitride by the process given in Example III. The coating of titanium nitride was adherent. The wear resistance of the copper roll was improved.

Example VI

A $TiCl_4/NH_3$ adduct was prepared as follows: 20 ml. of $TiCl_4$ was dissolved in 2 lbs. of dry carbon tetrachloride in a 2-liter 3-neck flask. The flask was equipped with an inlet tube, mechanical stirrer, and outlet tube. Dry ammonia gas was bubbled into the reaction vessel at the rate of 500 cc./min., while the liquid mixture was vigorously stirred. The inlet tube was immersed in the mixture to insure maximum contact with the ammonia. A finely divided, yellow precipitate was deposited immediately. As the ammonia gas was adsorbed, the temperature of the mixture rose to approximately 50° C. Upon completion of the reaction (approximately 1 hour) the bulk of the carbon tetrachloride was removed through a sintered glass filter and the remainder was condensed in a trap at high vacuum. The temperature of the dried product was raised to 150° C. and held there several hours while pumping was continued. The resulting yellow product was analyzed and found to be $TiCl_4/3NH_3$. A portion of this adduct was sublimed in vacuum at 210–220° C. Both the adduct, $TiCl_4/3NH_3$, and the sublimate were used in plating experiments to produce golden yellow titanium nitride coatings, e.g., as follows:

One gram of $TiCl_4/3NH_3$ adduct in a small vial was placed in the end of a 24" "Vycor" high temperature resistant glass test tube. A small piece of glass wool was placed against the mouth of the vial to prevent movement of the adduct into the plating area. A piece of 22-gauge nickel (6" x ½") was placed in the upper end of the "Vycor" high temperature resistant glass test tube at the center position of the 12" resistance furnace. The tube was evacuated, and the large furnace was heated to 600° C. The temperature of the adduct was raised rather rapidly to 350° C. under a pressure of less than 2 mm. Sublimation started at 220° C. and continued 10–15 min. while the pressure in the plating area went through a maximum of 0.3 mm. The nickel sheet was given a thin (approx. 0.2–0.3 micron), golden yellow, adherent coating of titanium nitride. Much of the sublimate passed through the tube unchanged and was recovered for further use.

One gram of the sublimate from $TiCl_4/3NH_3$ adduct was used to plate a piece of 22-gauge nickel following the procedure described in the above example. In this case also a thin, golden yellow, lustrous, adherent coating of titanium nitride was obtained.

Golden yellow coatings were obtained at plating temperatures of about 550–660° C. using the $TiCl_4/3NH_3$ adduct and the sublimate therefrom. At these temperatures the thickness of the coating was found to fall in the range of .1–.3 micron. At 800° C. the coatings were much thicker, i.e., 1–2 microns, but they were not as lustrous as those prepared at lower temperatures.

When ammonium iodide was added to the $TiCl_4/3NH_3$ adduct and the mixture used in the same manner as described above, good coatings of titanium nitride were likewise formed.

Example VII

A total of 0.6 gram of an adduct prepared by passing vapors of titanium tetrachloride through a "Vycor" high temperature resistant glass tube packed with $NH_4Cl$ evacuated to 0.05 mm. of Hg, and heated to 240° C., was placed in a "Vycor" high temperature resistant glass tube, 23 inches long, one inch in diameter, and closed at one end, and was covered with a piece of glass wool. A small porcelain spatula and a piece of "Vycor" high temperature resistant glass ⅝" x 3" were then placed in the tube about 5 inches away from the end of the tube. The "Vycor" high temperature resistant glass tube was then connected to a vacuum train through a cold trap. The end of the tube was placed in a 5" horizontal electric furnace and the rest of the tube in a 13" furnace. The tube was first evacuated and the rest of the tube then heated to 600° C. The small 5" furnace was turned on and heated very slowly to 260° C. It was found that the compound was completely sublimed in ½ hour under a pressure of less than 2 mm. The furnaces were then turned off, the tube was cooled, and brought to atmospheric pressure by admitting air into the tube. Both the porcelain spatula and the "Vycor" high temperature resistant glass strip placed in the long furnace were coated with a film of strongly adherent golden yellow coating of TiN.

The coatings of TiN on "Vycor" high temperature resistant glass and porcelain surfaces are strongly adherent. Boiling concentrated hydrochloric and nitric acids do not remove these coatings, but they dissolve slowly in boiling concentrated sulfuric acid. It was found that ceramic objects coated with TiN when brought in contact with 48% hydrofluoric acid for a few minutes formed golden yellow flakes of TiN. These flakes are insoluble in hydrofluoric acid.

In a typical test about 40 ml. 48% hydrofluoric acid was poured in a "Vycor" high temperature resistant glass tube coated with TiN, shaken for two minutes, and immediately dumped into a beaker containing 400 ml. water. This suspension was immediately centrifuged and decanted. The flakes were washed several times with water in order to remove the fluoride ions. The titanium nitride flakes were then dried in an oven at 150° C.

Flakes of similarly prepared titanium nitride were dispersed in nitrocellulose lacquer and the resulting lacquer coated on glass. The resulting coating had an attractive golden sparkle.

Example VIII

One gram of $TiF_4/NH_3$ adduct prepared in carbon tetrachloride by the general method of Example VI was placed in a small vial at the end of a 24-inch "Vycor" high temperature resistant glass tube. Plating of a 22-gauge nickel sheet was carried out as described in Example VI. The adduct was heated rather slowly while the nickel sheet was being heated at 800° C. Sublimation started in the range of 300–350° C. under a pressure of 0.5 mm. The nickel sheet acquired an adherent coating of titanium nitride which had a thickness of 0.43 micron.

Example IX

One gram of TiBr$_4$/NH$_3$ adduct was used to plate porcelain at 600° C. employing the general procedure and equipment described in Example VI. The adduct was heated so that the vapors were carried rapidly through the plating area. The porcelain surface thus acquired a golden-yellow coating of titanium nitride to a thickness of 0.25 micron.

Example X

The TiBr$_4$/NH$_3$ adduct of Example IX was sublimed at 195–205° C. under vacuum to give a dark, crystalline product. One gram of this material was used to coat a porcelain object at 800° C. by heating the adduct at a temperature of 400° C. under a pressure of 0.3 mm. to give rapid volatilization through the plating area. The porcelain surface was given a golden-yellow adherent coating of titanium nitride which had a thickness of 0.3 micron.

Example XI

Three grams of TiI$_4$/NH$_3$ adduct prepared as in Example VI was used to plate a porcelain object at 800° C. using the general procedure of Example VI. The adduct was heated slowly to obtain a low rate of vapor flow through the plating area. The porcelain surface was thereby given a golden-yellow adherent coating of titanium nitride which had a thickness of 0.9 micron.

When the above procedure was repeated except that autobody steel was employed, the golden yellow coating of titanium nitride obtained on it could be scraped off in the form of flakes which had a thickness of 0.9 micron and a surface area of about one sq. mm.

Example XII

A zirconium tetrachloride/ammonia adduct was prepared by the general method described in Example VI, i.e., by passing dry ammonia gas into a suspension of zirconium tetrachloride in carbon tetrachloride. The adduct was a white fluffy substance. A portion of the adduct (0.7 g.) was placed in a tube such as described in Example VII. The system was evacuated to about 0.05 mm. When the short furnace containing the adduct was heated to 260° C. for two hours, with the glass tube in the main furnace and porcelain inside it heated to about 800° C., there was obtained a golden zirconium nitride coating of about 0.5 micron thickness on the porcelain.

When the above was repeated except that the temperature was higher (the tube being at 920° C.), the yellow adherent abrasion-resistant coating obtained had a thickness of 2.2 microns.

As starting materials for the new process of this invention an adduct of ammonia or an ammonium halide with vanadium or a group IV–B metal tetrahalide is employed. The adduct can be prepared and purified prior to employment in the process or it can be prepared and employed directly in the reaction. Although any tetrahalide, i.e., fluoride, iodide, bromide, or chloride, can be employed, the chlorides are generally cheaper and more readily available. The decomposition reaction whereby the nitride is formed results in the production of some of the corresponding hydrogen halide which may subject the apparatus to the action of the hydrogen halide. The latter attacks certain substrates and lowers adhesion of the coating of the nitride.

The group IV–B metals are those of the Fisher Scientific Co. Periodic Chart of 1951, i.e., titanium, zirconium and hafnium. Of the metals, titanium and vanadium are prepared for reasons of availability and reactivity.

The adduct is heated at a temperature sufficient to induce volatilization under reduced pressure which must be less than 100 mm. of Hg and is generally less than 5 mm. and preferably less than 2 mm. The temperature at which volatilization takes place is within the range of 175–400° C.

The vapors thus produced in the system are then contacted directly with a solid surface to be coated. The surface must be heated to between 550 and 950° C. to bring about the formation of a uniform nitride coating. Preferably the temperature is in the range of 600–850° C. A particular advantage of this invention is that higher temperatures are not necessary.

This invention provides a process for the production of uniform coatings as well as the preparation of flakes, both of which can be referred to as pellicles, of vanadium and group IV–B metal nitrides. The coatings have properties which make them particularly desired for decoration, i.e., they are inert, hard and attractive. The metal nitride coatings can be formed on any substrate that is inert under the coating conditions, e.g., which can withstand heating to at least 550° C., such as metals, ceramics and the like.

The flakes are valuable as inert pigment flakes for decorative and protective film formation. They can be dispersed in lacquers, or oils and applied by conventional means to provide attractive finishes having, e.g., a golden yellow pearlescent metallic sparkle and sheen from titanium nitride. Thus, titanium nitride prepared in thin flake form, approximately 1 x 20 x 50 microns results in an attractive gold metallic finish. The new flakes of this invention have a thickness of 0.1 to 3 microns with those having a thickness of between 0.25 and 2.5 microns being preferred. The other two dimensions are within the range of 20 to 100 microns.

Flakes that are thicker than 3 microns when used in finishes result in an uneven surface. Flakes that are thinner than 0.1 micron do not give uniform color in the resulting finish. Flakes having the width and length defined previously are obtained by subjecting larger flakes or pellicles to shearing action. Separation of flake having the desired dimensions from undesired flake is effected through sieves or conventional separation techniques.

The coated objects having the adherent uniform coatings are of considerable importance due to the inertness, hardness, resistance to high temperature such as 800° C. or higher in air, and attractive color of the nitride coatings.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. Process for preparing thin pigment flakes of a nitride of a metal selected from the class consisting of vanadium and group IV–B metals which comprises heating in a vaporizing zone, at a temperature within the range of 175 to 400° C. under a pressure of less than 100 mm., an adduct of a tetrahalide of a metal selected from the class consisting of vanadium and group IV–B metals and a compound selected from the class consisting of ammonia and ammonium halides, thereby vaporizing said adduct, immediately passing said vaporized adduct into a coating zone and into contact therein with the surface of an inert solid substrate which is at a temperature of 550° to 950° C. and under a pressure of less than 100 mm., thereby forming on the surface of said solid substrate a coating having a thickness of 0.1 to 3 microns of a nitride of a metal selected from the class consisting of vanadium and group IV–B metals, and removing said coating in the form of thin pigment flakes from the surface of said solid substrate.

2. Process as set forth in claim 1 wherein said tetrahalide of a metal is a vanadium tetrahalide and said nitride of a metal is vanadium nitride.

3. Process as set forth in claim 1 wherein said adduct is an adduct of vanadium tetrachloride and ammonia, and said nitride of a metal is vanadium nitride.

4. Process as set forth in claim 1 wherein said tetrahalide of a metal is a zirconium tetrahalide, and said nitride of a metal is zirconium nitride.

5. Process for preparing thin pigment flakes of a nitride of a metal selected from the class consisting of vanadium and group IV–B metals which comprises heating in a vaporizing zone, at a temperature within the range of 175 to 400° C. under a pressure of less than 5 mm., an adduct of a tetrahalide of a metal selected from the class consisting of vanadium and group IV–B metals and a compound selected from the class consisting of ammonia and ammonium halides, thereby vaporizing said adduct, immediately passing said vaporized adduct into a coating zone and into contact therein with the surface of an inert solid metal substrate which is at a temperature of 550 to 950° C. and under a pressure of less than 5 mm., thereby forming on the surface of said solid metal substrate a coating having a thickness of 0.1 to 3 microns of a nitride of a metal selected from the class consisting said coating in the form of thin pigment flakes from the surface of said solid metal substrate.

6. Process for preparing thin pigment flakes of a nitride of a metal selected from the class consisting of vanadium and group IV–B metals which comprises heating in a vaporizing zone, at a temperature within the range of 175 to 400° C. under a pressure of less than 5 mm., an adduct of a tetrahalide of a metal selected from the class consisting of vanadium and group IV–B metals and a compound selected from the class consisting of ammonia and amomnium halides, thereby vaporizing said adduct, immediately passing said vaporized adduct into a coating zone and into contact therein with the surface of an inert solid ceramic substrate which is at a temperature of 550 to 950° C. and under a pressure of less than 5 mm., thereby forming on the surface of said solid ceramic substrate a coating having a thickness of 0.1 to 3 microns of a nitride of a metal selected from the class consisting of vanadium and group IV–B metals, and removing said coating in the form of thin pigment flakes from the surface of said solid ceramic substrate by contacting with hydrofluoric acid.

7. Process for preparing thin pigment golden flakes of titanium nitride which comprises heating in a vaporizing zone, at a temperature within the range of 175 to 400° C., under a pressure of less than 100 mm., an adduct of a titanium tetrahalide and a compound selected from the class consisting of ammonia and amomnium halides, thereby vaporizing said adduct, immediately passing said vaporized adduct into a coating zone and into contact therein with the surface of an inert solid substrate which is at a temperature of 550 to 950° C. and under a pressure of less than 100 mm., thereby forming on the surface of said solid substrate a titanium nitride coating having a thickness of 0.1 to 3 microns, and removing said coating in the form of thin pigment golden flakes of titanium nitride from the surface of said solid substrate.

8. Process as set forth in claim 7 wherein said adduct is an adduct of titanium tetrachloride and ammonium chloride.

9. Process for preparing thin pigment golden flakes of titanium nitride which comprises heating in a vaporizing zone, at a temperature within the range of 175 to 400° C. under a pressure of less than 100 mm., an adduct of titanium tetrachloride and ammonia, thereby vaporizing said adduct, immediately passing said vaporized adduct into a coating zone and into contact therein with the surface of an inert solid substrate which is at a temperature of 550° to 950° C. and under a pressure of less than 100 mm., thereby forming on the surface of said solid substrate a titanium nitride coating having a coating of 0.1 to 3 microns, and removing said coating in the form of thin pigment golden flakes of titanium nitride from the surface of said solid substrate.

10. Process for preparing thin pigment golden flakes of titanium nitride which comprises heating in a vaporizing zone, at a temperature within the range of 175 to 400° C. under a pressure of less than 5 mm., an adduct of titanium tetrachloride and ammonia, thereby vaporizing said adduct, immediately passing said vaporized adduct into a coating zone and into contact therein with the surface of an inert solid metal substrate which is at a temperature of 550 to 950° C. and under a pressure of less than 5 mm., thereby forming on the surface of said solid metal substrate a titanium nitride coating having a thickness of 0.1 to 3 microns, and removing said coating in the form of thin pigment golden flakes of titanium nitride from the surface of said solid metal substrate.

11. Process as set forth in claim 10 wherein said adduct of titanium tetrachloride and ammonia contains an ammonium halide.

References Cited in the file of this patent

Mellor: "Comprehensive Treatise on Inorganic and Theoretical Chemistry," vol. 8, 1928, pages 118, 119, 120, 124 and 125.

"The Vapor-Phase Deposition of Refractory Materials," I. E. Campbell et al., Transactions of the Electro-Chemical Society, vol. 96, pages 318–333, The Electro Chemical Society, Inc., New York 25, N.Y.

UNITED STATES PATENT OFFICE
CERTIFICATE OF CORRECTION

Patent No. 3,032,397

May 1, 1962

Donald O. Niederhauser

It is hereby certified that error appears in the above numbered patent requiring correction and that the said Letters Patent should read as corrected below.

Column 5, line 69, for "prepared" read -- preferred --; column 7, line 19, after "consisting" insert -- of vanadium and Group IV-B metals, and scraping off --; column 8, line 20, for "coating", second occurrence, read -- thickness --.

Signed and sealed this 2nd day of October 1962.

(SEAL)
Attest:

ERNEST W. SWIDER
Attesting Officer

DAVID L. LADD
Commissioner of Patents